US006262764B1

United States Patent
Perterson (10) Patent No.: US 6,262,764 B1
(45) Date of Patent: *Jul. 17, 2001

(54) VEHICLE SURVEILLANCE SYSTEM INCORPORATING REMOTE AND VIDEO DATA INPUT

(76) Inventor: Roger Perterson, Drawer 567 County Rd. 375, Old Ocean, TX (US) 77463

( * ) Notice: Subject to any disclaimer, the term of this patent is extended or adjusted under 35 U.S.C. 154(b) by 0 days.

This patent is subject to a terminal disclaimer.

(21) Appl. No.: 09/393,750

(22) Filed: Sep. 10, 1999

Related U.S. Application Data (63) Continuation of application No. 08/363,607, filed on Dec. 23, 1994, now Pat. No. 6,037,977.

(51) Int. Cl.[7] .................................................. H04N 7/18
(52) U.S. Cl. ........................................ 348/148; 348/158
(58) Field of Search ............................ 248/551; 342/457; 340/539, 936; 348/143, 148, 149, 151–159, 376; 358/906; H04N 7/18

(56) References Cited

U.S. PATENT DOCUMENTS

| | | | |
|---|---|---|---|
| 4,097,893 | * 6/1978 | Camras ................................. | 348/158 |
| 4,166,273 | * 8/1979 | Riley, Jr. et al. .................... | 340/539 |
| 4,789,904 | * 12/1988 | Peterson ............................... | 348/148 |
| 4,843,463 | * 6/1989 | Michetti ................................ | 348/148 |
| 4,884,132 | * 11/1989 | Morris et al. ........................ | 358/906 |
| 4,949,186 | * 8/1990 | Peterson .............................. | 348/149 |
| 5,381,155 | * 1/1995 | Gerber ................................. | 340/936 |
| 5,406,324 | * 4/1995 | Roth .................................... | 348/148 |
| 5,594,498 | * 1/1997 | Fraley ................................. | 348/158 |
| 5,731,785 | * 3/1998 | Lemelson et al. .................. | 342/457 |
| 5,921,523 | * 7/1999 | South et al. ........................ | 248/551 |

* cited by examiner

Primary Examiner—Richard Lee
(74) Attorney, Agent, or Firm—Thomason, Moser & Patterson, L.L.P.

(57) ABSTRACT

The present structure incorporates a police vehicle which is provided with a closed vault securing a VCR in the trunk. A first camera is mounted on the dash. A second camera is mounted on a portable structure such as a clipboard which is removed from the vehicle. A telemetry link from the clipboard to the vehicle is established for transmitting video data to and from the police officer on foot out of the vehicle. Likewise, a digital data transmission link is established with various input and output devices on the clipboard. At the vehicle, one or more images are recorded on a VCR, and digital data can be transmitted from the vehicle to a remote site for communication with a remotely located police computer or other data base to enable enhanced performance in the field.

68 Claims, 3 Drawing Sheets

VEHICLE SURVEILLANCE SYSTEM INCORPORATING REMOTE AND VIDEO DATA INPUT

This is a continuation application of U.S. patent application Ser. No. 08/363,607 filed Dec. 23, 1994, now U.S. Pat. No. 6,037,977.

BACKGROUND OF THE DISCLOSURE

The present disclosure is directed to and sets forth improved features in a police surveillance system and in particular a surveillance system which incorporates a mechanism for providing both a fixed field of view and a movable field of a view cameras. In particular, this finds advantageous use in police vehicles where police personnel are alone at the time of confrontation with those who might otherwise respond to a traffic stop with unexpected violence. Even where no violence occurs, there is an advantage in the present system which enables the single police officer to obtain data in a way which more fully records the nature of the event and which also provides dynamic data input to the police officer at the time of the investigation conducted by the officer.

Consider as an example a police officer who, in daylight, goes into a neighborhood to investigate a neighborhood incident. As the officer arrives at a particular place where the police vehicle is stopped temporarily, the officer then exits the vehicle, travels on foot in the near locale, and is provided with TV, digital data and voice communication link from the officer to the vehicle and from the vehicle to another location keeping the vehicle (and hence the officer ) in ready contact with police headquarters, or some other facility (e.g., a second officer in a car). Where the officer is on foot, and where another officer is on foot, and contact is made with a person arousing suspicion of either officer, data can be collected by the officer at the scene. This collected data can be transferred from the officer at the scene to the vehicle and from the vehicle to the remote facility. This is especially helpful where the officer is unsure of identity of the persons in the vicinity, ownership of the building, ownership of a parked vehicle, etc.

In another circumstance, a police officer in the vehicle may make a traffic stop in the dark. Proper operating procedures requires the police vehicle stop to the rear of the traffic offender. Typically, 10 to 20 feet is left between the two vehicles. In this particular instance, the police vehicle, equipped with ordinary headlights, provides illumination of the immediate field of view. As set forth in the earlier patens of the present inventor which are U.S. Pat. Nos. 4,949,186 and 4,789,904, the police vehicle is equipped with a video camera which is mounted on the dash. The field of view of the camera is illuminated adequately to obtain proper imaging of events which may occur in that illuminated area. The police officer may be required to step out of the vehicle. In this particular instance, the police officer normally conducts all business in the camera field of view so that the officer is completely illuminated, and all actions of the traffic stop are illuminated and therefore filmed. If an arrest occurs, or if an investigation is conducted for driver sobriety is conducted, the field of view normally will catch these events. It is however helpful to incorporate a portable camera to capture any events not readily in view of the dash mounted camera. Here, the term camera also refers to a device which is carried by the police officer. The police officer is provided with some hand held device; in this instance, the present disclosure sets forth a clipboard incorporating a top writing surface.

The police officer normally needs a clipboard. The clipboard incorporates a portable camera in the clipboard. In addition, the clipboard is provided with a panic switch sometime known as a dead man switch. Furthermore, the clipboard is constructed and arranged so that it has a relatively thick backing which encloses the electronic equipment which is necessary for operation of the clipboard. In one aspect, the clipboard is constructed with a card reader. The card reader can be used to read the driver's license of the person who has been pulled over for investigation or perhaps for arrest. With interrogation prior to arrest, the driver typically is asked to produce drivers license and insurance papers. In some states, the drivers license is distributed with a magnetic strip in the drivers license which is readable by a card reader such as the type of device used to read credit cards, In this instance, the clipboard carries such a card reader. The data from the card reader is input to a CPU and then delivered to a keyboard mounted transmitter. Thus, the clipboard carries a digital data transmitter, and also carries a video data transmitter.

The two data channels are separate in the clipboard. In one instance, the data is obtained from the camera integrated with the clipboard so the officer on foot can obtain a field of view. Digital data is transmitted in data bursts during the video transmission blanking interval. While that occurs in the video channel, the digital channel is used for transferred digital data as mentioned such as the reading of a card reader to obtain the specific drivers license on reading the drivers license. Alternate the drivers license. Alternately, a keyboard or other type switches can be used to input data. In one aspect, the drivers license can be input with a simple ten key pad which provides numeric data. Optionally, additional keys can be added to provide the stop and start functions. A full keyboard can be utilized such as a keyboard providing the twenty-six letters plus ten numeric representations or a keyboard totaling thirty-six keyboard switches. Conveniently, the clipboard is likewise equipped with either an LCD output display capable of presenting M lines of data where each line is N characters in length. In another aspect, rather than use an LCD screen, a thermographic printer or impact printer can be used to provide hard copy output with 10, 26 or 36 symbols. Optionally, the clipboard can likewise incorporates a receiver with a small screen so that information can be transferred back to the police officer from some remote location. Paper technology now in use can send from a synchronous satellite a burst of digitally encoded data such as the M by N message. That data can be displayed on an LCD display or printed by a printer.

As will be understood, this enables the police officer to obtain a better appraisal of the situation and to thereby provide dynamic, field oriented data which enables the police officer to determine on the spot all steps necessary to be undertaken during field activities. The police officer is infinitely safer in this circumstance. In the event of a violent encounter, data is typically captured which makes the investigation thereafter much more easier. In the event that the police officer is tragically killed, there is sufficient data which has been captured to markedly speed up the investigation. Indeed, should the police officer encounter difficulties, a panic switch is likewise included which enables the police officer to send information, or an urgent call for other units in the nearby vicinity. The panic switch is sometimes known as a dead man switch. All of these features enhance the ability of police officers to carry out their work.

The present apparatus is summarized as a system utilizing the video surveillance system set forth in the above mentioned patents of the present inventor which are enhanced with a number of additional features. One important feature is the portable camera discussed briefly above. In another aspect of the present disclosure, the officer is provided both with audio and video two way communication. In an alternate aspect of the present disclosure, all data is recorded out of sight. The out of sight aspect involves the use of a vault hidden out of sight in the trunk of the vehicle, the vault containing a VCR system. Two types of data are input to the VCR and they are the digital data such as time of day, date of the month, and other alphanumeric data. All of this occurs in conjunction with the recording of video data from on or even two sources. Where the two video sources are input, simultaneous recording can occur either by recording a split image screen (two images on one screen) or recording the data with alternate frames. In the latter event, the two video data frames are interlaced. Ordinarily, with two video cameras, the fixed camera is preferred in operation so that its image is recorded. The portable camera is operated usually in special circumstances so that it is recorded only when used in a mobile fashion.

In one particular aspect of the present disclosure, the data stream of the present disclosure is a stream of digital data obtained in the field and transmitted from a portable location by the officer on foot, sent as an intermediate step to the vehicle, and then transmitted from the vehicle to a receiver at a remote location such as a receiver fixed in synchronous satellite orbit or on the top of a tall antenna in the vicinity to thereby enable return of data along the same route from a central data bank. In the latter event, driver records, prior convictions, vehicle ownership, and criminal records can be transmitted to the officer in the field.

IN THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may add to other equally effective embodiments.

DETAILED DESCRIPTION OF THE PREFERRED EMBODIMENT

Figure 1:
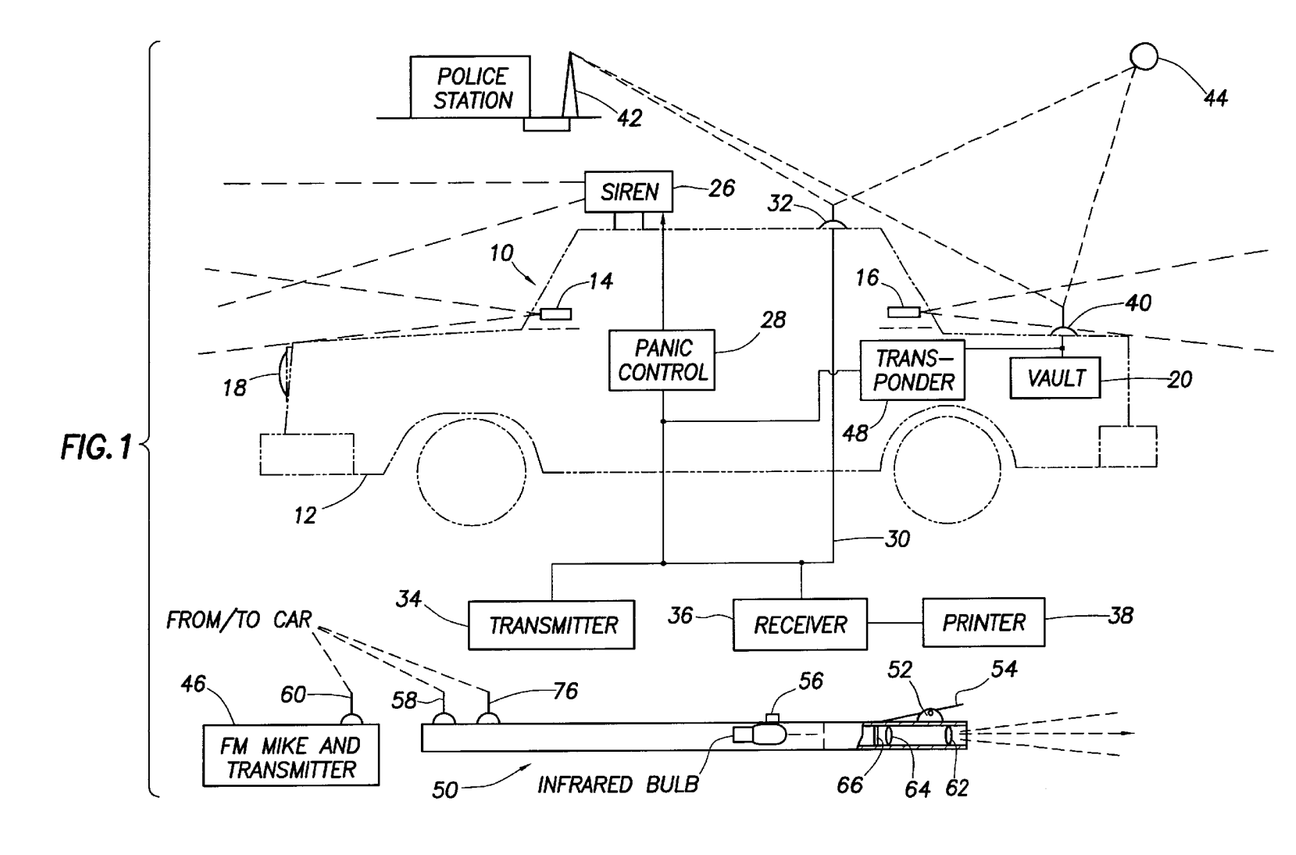
FIG. 1 shows an automobile used as a police vehicle equipped with a surveillance system in accordance with the teachings of the present disclosure and showing the correlation of the vehicle with transmitter sites located near the vehicle with communication to and from remote transmitter sites.

Going now to FIG. 1 of the drawings, the numeral 10 identifies a police vehicle which is equipped with a video surveillance system in accordance with the above mentioned previously issued patents of the current inventor. The surveillance system is installed in a police car 12 which is equipped with a fixed field camera 14 installed on the dash to look forwardly. It has a fixed field of view. The field of view is illuminated by conventional vehicle headlights 18 at the front of the vehicle. The headlights illuminate the area which is observed by the camera 14. The camera 14 is relatively small and even inconspicuous. Its relative size enables it to be mounted on the dash without interfering with the field of vision of police personnel in the vehicle, and yet the field of view is directed so that it is able to see a stopped vehicle perhaps 10 to 15 feet in front of the police vehicle in accordance with proper police procedures when the vehicle 10 is stopped. A similar rearwardly looking camera 16 is mounted to observe a fixed field of view through the rear window. The camera 16 observes activity to the rear of the police car 12. The police vehicle is equipped with a vault 20 which is stored out of sight in the trunk which vault encloses the VCR or video recorder. Diverting attention momentarily to FIG. 3 of the drawings, the VCR 22 records on a removable cassette. Typically, it is operated at a speed with a cassette 24 of substantial length so that one shift of police operation can be recorded. Recording an eight hour shift on one cassette is highly desirable. This enables the cassette 24 to be removed from the vault 20. In the ordinary course, removal of the cassette 24 occurs at the shift change by the police officer at some safe location. Going back however to FIG. 1 of the drawings, the police vehicle is provided with the vault 20 which is locked in the trunk of the car so that it is secure and out of sight. As illustrated by broken lines in the drawings, the trunk interior has been exposed but the vault is hidden from view.

The police vehicle is equipped with an external light bar and siren 26. The siren 26 is operated normally by the police officer. This can be done simply by switching the siren on. The siren is typically mounted on the roof and can be conveniently installed in a light bar which includes on or more blinking lights to serve as an attention getting structure. In addition, FIG. 1 shows the field of illumination of lights in the light bar. One light can be an infra-red bulf to enable illuminating and observation of the area with a camera having infra-red response. While it is normally operated intentionally, it can also be operated by means of a panic control switch 28. The panic control switch is operatively connected with a digital control system which includes a connection with a system bus 30. The bus 30 is incorporated in the vehicle for connection with an antenna 32. The digital portion of the equipment utilizes the antenna 32 in conjunction with an appropriate transmitter 34 and suitable receiver 36 to operate at a specified frequency. More will be noted concerning that hereinafter. In the vehicle, a printer 38 is likewise provided to output data of importance to the police officer.

As mentioned, the system is preferably constructed with one channel which communicates digital information. It can be transmitted and received at a specified frequency, typically about 200 megahertz or less. While higher frequencies can be used, and selected portions of the RF spectrum are allocated for that data transfer, it is not essential that very high frequencies be used. This is to be contrasted with an antenna 40 which operates a much higher frequencies including frequencies at 1.0 gigahertz or greater. Because of the larger bandwidth required for video transmission, it is expedient that the video data of the system be connected with the antenna 40 to transmit to the illustrated remote sites. A common frequency is the 900 megahertz band with a transmitter power of about 0.1 watts.

As illustrated in the drawings, the vehicle transmits to an antenna 42 which is deployed on a tall tower or on an adjacent mountain or other elevated site. In flatter locations, it is readily mounted on top of a tall building. This is an antenna which communicates with the community at large. This antenna is used to blanket the entire area or a particular legal jurisdiction so that many police vehicles can be controlled in this area.

The tower 42 as illustrated in FIG. 1 is located on the top of an adjacent mountain. As will be understood, the structure which supports the tower can be subject to wide variation. In another version of the present disclosure, a synchronous satellite 44 is used as a relay station. The synchronous satellite is an alternate mode of providing an elevated antenna so that proper communications can be obtained through the use of the system. Furthermore, the satellite is located above the vehicle so that transmissions can be made to and from the vehicle. In one aspect of the present disclosure, the vehicle is provided with a transponder 48. The transponder is used with both the antennas 42 and 44 to locate the vehicle. In one aspect of this, the vehicle can be located in the same fashion as LORAN is used to locate ships at sea. In this particular instance, the transponder 48 is connected with the antenna 40 and it is able to provide signals which are communicated back and forth between the transmitter locations and the vehicle so that the vehicle can be fixed at a particular geographic location. By triangulation in the instance of LORAN, the position of the moving transponder can then be determined with respect to a pair of transmitters which are deployed at spaced locations. In this particular instance, the representative antennas 42 and 44 serve as sources of data which is transmitted to the vehicle for the express purpose of locating the vehicle. Indeed, the equipment in the transponder can readily include an output system which provides the location of the vehicle both in the vehicle and to remote equipment. The remote equipment in this instance is provided with information defining the vehicle location so that the police officer has the assurance that reinforcements can be quickly summoned and can locate the police officer in the moment of distress. In particular, the panic control 28 can optionally be used to initiate operation of the transponder so that the transponder sends a panic related signal. This signal, received by the antennas 42 and 44, can then be used to provide an indication of vehicle location, the need for assistance, and perhaps some specifics regarding the nature of the stop or other encounter which requires assistance.

FIG. 1 shows additional equipment which is carried in the vehicle 10. In one version, the vehicle is provided with an FM mike and transmitter identified generally at 46. Routinely, this is clipped on the shirt of the police officer so that conversations of the police officer can be transmitted across the short distance. This typically has the form of a FM transmitter which has the range to transmit at least 100 feet to the vehicle 10 so that the signal is received by the antenna 32. The audio signal is preferably superimposed on the cassette tape which records the video signal. This enables synchronization of the voice or audio data in conjunction with the images which are observed at the time. FIG. 1 also shows a portable clipboard mounted camera system. Details of this system will be noted momentarily.

Portable Camera

A portable camera is provided by the present disclosure. This is constructed by installing the camera with miniaturized components in the back of the clipboard 50. The clipboard is provided with an upstanding pair of tabs 52 which cooperate with an edge located clamp 54 for clamping documents and other printed matter on the clipboard. The clipboard is also constructed with a hand operated panic switch. The switch 56 functions as a dead man switch when the police officer depresses the switch 56 and holds it down. As long as it is held down, the video is transmitted while no panic signal is transmitted. On release of the switch 56, a panic signal can then be transmitted. That signal operates in conjunction with the digital data transmission system utilizing the antenna 58 on the clipboard. As previously noted, the clipboard is preferably carried in the hand of the police personnel. The FM mike includes an antenna also which provides a separate transmission path. The clipboard antenna 58 transmits digital data. The FM mike 46 is provided with an antenna 60. The antenna 60 transmits the audio conversations of the police officer. The transmitter antennas 58 and 60 transmit to the vicinity of the automobile 10 so that the signals are picked up and applied to the other circuit components. This is done through the antennas 58 and 60.

Figure 2:
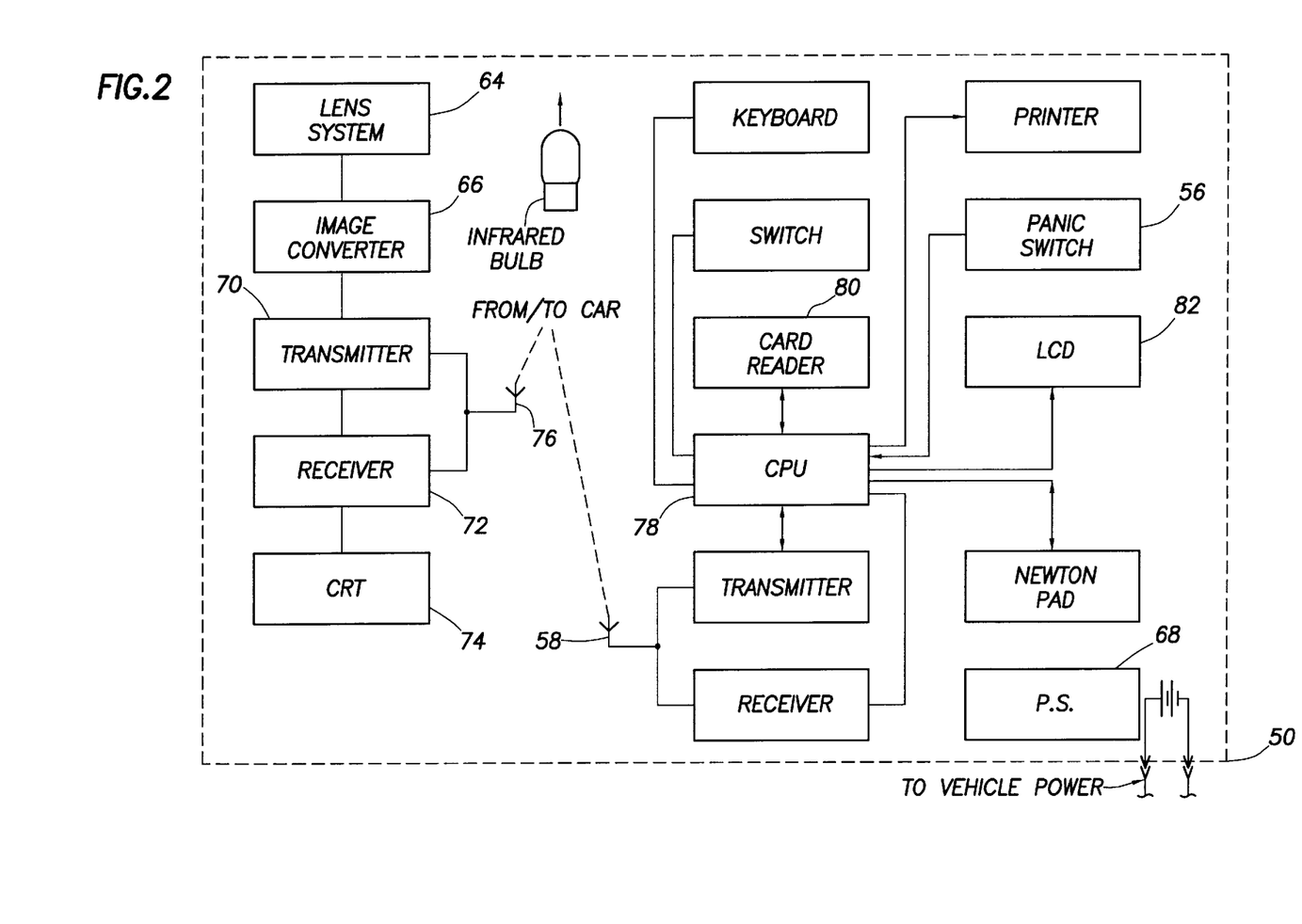
FIG. 2 is a view of apparatus incorporated in a portable clipboard used by a police officer to enhance the surveillance obtained by the police officer to enhance the surveillance obtained by the police officer and further enabling both digital, audio and visual communication to and from the police officer when out of the vehicle shown in FIG. 1.

Going further, the clipboard 50 is constructed with an optical system. More specifically, a first lens 62 is shown where a wall portion has been broken away. It cooperates with a second len 64 to provide an optical system which defines a focused image on an image converter 66. The image converters 66 converts the visual scene into a set of pixels. The pixels are periodically scanned to form the video signal. The clipboard includes other equipment which will be discussed with regard to FIG. 2 of the drawings. In FIG. 2 of the drawings, the various components are noted in conjunction with the lens system 64. Scanning of the image involves blanking typical of video image conversion so that the time of blanking is used to advantage in digital data transmission. The field of view is defined by the lens system. If desired, the field of view can be illuminated with infra-red light.

The clipboard is a portable device which is carried under the arm or in the had of the police officer. In that position, the police officer is able to have communications linking the officer to the vehicle. This is accomplished notwithstanding the fact that the officer dismounts the vehicle 10 and travels on foot in the immediate vicinity. The clipboard is preferably constructed with a relatively common appearance but it is made with thick construction so that the clipboard is used in the ordinary way. The clipboard hides the portable equipment so that it is not usually recognized as an optical camera system with other components as will be detailed. This requires a part that the clipboard includes various input and output devices which are detailed in FIG. 2 of the drawings. Typically, the clipboard provides a communications range of about 100 to 200 feet. Generally, it is not desirable that the police officers stray further than this from the vehicle.

Attention is now directed to FIG. 2 of the drawings. There, the clipboard 50 is shown in dotted line representation as the cabinet or housing of the equipment that is constructed in the clipboard. It is stored in the vehicle 10 when not in use. By means of a suitable plug and socket, a power supply in the clipboard is powered when the board 50 is not in use. The power supply 68 for the clipboard power system shown in FIG. 2 of the drawings operates the portable clipboard. The device optionally turns on the infra-red bulb to assist in night viewing cooperative with an image converter responsive to infra-red light.

The equipment supported in the clipboard 50, thereby providing a mobile system, utilizes the lens system 64 with the image converter 66. That is connected to a video transmitter 70. The transmitter 70 optionally cooperates with a video receiver 72. The receiver 72 can be omitted if desired. The receiver however is shown in FIG. 2 of the drawings connected with a CRT 74. The CRT 74 provides a video image for the police officer. The transmitter and receiver both connect with a video antenna 76. The antenna 76 is incorporated in the clipboard. The antenna 76 is mounted so that the antenna can be used readily without interference to the clipboard equipment.

The clipboard also includes several additional components of note. Among these, the clipboard is provided with a digital data transmitter and receiver. These connect with the antenna 58 previously mentioned. If desired, the antennas 58 and 76 can be combined. The two of them can be combined so that both can transmit to and from the adjacent car 10. More importantly, the clipboard supports the switch 56 which is input to a CPU 78. The CPU operates in conjunction with various input devices such as the keyboard, switch and card reader 80. The card reader 80 is provided with one or more reading heads to capture output data from a magnetic card. That type of reader is normally described as a magnetic strip reader. Another input device is the Newton Pad (a trademark of Apple Computer) useful to read and input handwritten messages or data. The clipboard has 10, 26 or 36 key input device. Alternate functions can be accomplished depending on the number of keys incorporated. An on/off switch is likewise included to render the device operative. This switch is different from the panic switch. The panic switch provides an emergency transmission so that assistance can be quickly summoned. The digital data which is segregated to the right side of FIG. 2 is input to and from the CPU which then communicates with both a transmitter and receiver. This enables data to be transmitted to and from the clipboard. As desired, the clipboard can be provided with an output device suitable for viewing by the user. An optical output device is the CRT 74. Another output device is the LCD display. Alternately, a printer can be incorporated to form a hard copy output from the clipboard 50. Operations will be made more readily apparent hereinafter.

Figures 3, 4:
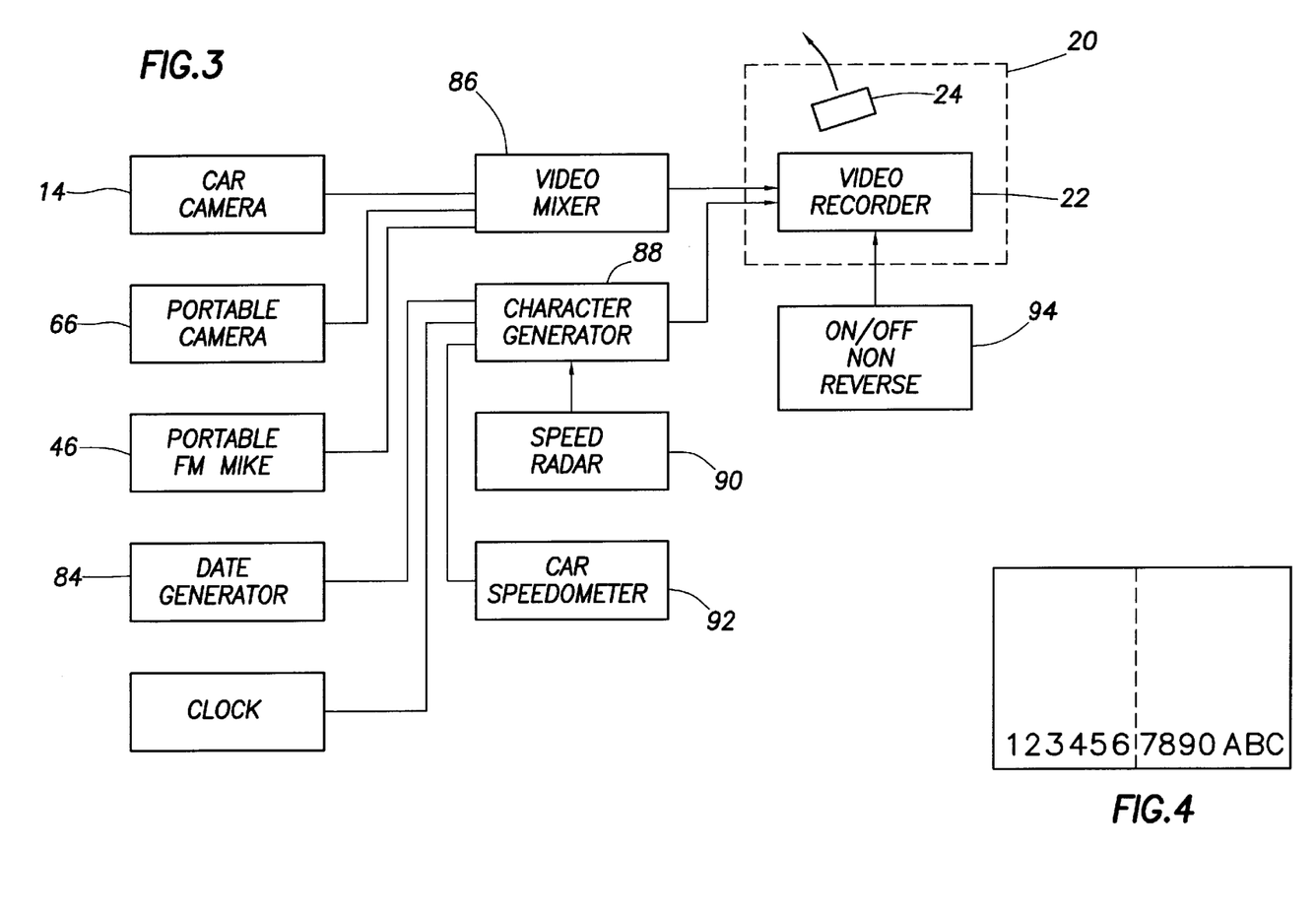
FIG. 3 is a block diagram schematic of the data flow path of certain data involved in the police surveillance system and further showing both video and digital transfer to a tape recorder maintained in the vault aboard the police vehicle.
FIG. 4 is the screen of video data from two video channels.

Going now to FIG. 3 of the drawings, the numeral 14 identifies the car mounted camera 14. The camera which is in the clipboard is the portable camera. The numeral 66 is used to indicate that camera. The portable FM mike and transmitter are identified at 46, those items being described previously with regard to FIG. 1 of the drawings. There is a date generator 84 which operates in conjunction with a clock. The cameras 14 and 66 are input to a video mixer 86. There is also a character generator 88. These characters are displayed as will be described. The character generator is provided with a digitized input from a speed radar device 90. The vehicle may be moving and to this end, the automobile 10 includes a car mounted speedometer 92 which provides a suitable output data for the character generator. In like fashion, the video recorder 22 is operated by or in conjunction with a nonreversing switch 94. More will be noted concerning the operation of the components shown in FIGS. 2 and 3 when considered jointly.

Details of Operation

In the disclosed system, there is an advantage to transmitting digital data and video data. Ordinarily, video data requires a larger bandwidth. For example, commercial TV requires a bandwidth of approximately 6 megahertz. In the present invention, it is preferable to transmit the video data at a frequency of 0.9 gigahertz or higher. The spectra available at higher frequencies encourages better definition and permits transmission of the data with the necessary bandwidth. In one aspect of the present disclosure, the two channels of data are treated separately or can be combined by utilization of a digital transmission within the bandwidth of the video bandwidth. For instance, it is well known to transmit digital data, inevitably requiring a narrow frequency band, with special data encoding techniques. Therefore, the digital data involved in the present system can be transmitted either by PCM or other techniques within the bandwidth for the video. If that approach is taken, a single antenna system is normally all that is required. Consider as an example transmission of the video signal with a bandwidth of 6 megahertz at a center frequency above 0.9 gigahertz. Within that bandwidth, but at one edge of the pass band, the digital data can be transmitted at a fixed frequency with PCM or FSK transmission techniques. Separately, the FM mike and transmitter 46 previously mentioned can likewise be centered at a particular frequency in the video band. This reduces the complexity of the system significantly. It likewise enables easy antenna deployment because the antenna is able to recover all signals received by it, and separates the signals as a result of the different types of modulation and frequency content, and also provides easy segregation of the transmitted data between the video and digital data. Digital bursts can be sent during video blanking.

Going now to the schematic block diagram shown in FIG. 2 of the drawings, assume for purposes of description that the police officer has all the equipment in an operative state, and makes a vehicle stop on the side of a road. At that time, the VCR in the vault 20 is recording data on the cassette 24. The recorder 22 operates during the traffic stops while provided with an image from the camera 14 through the video mixer 86. The clock, data generator 84, radar 90 and speedometer 92 all provide data to the character generator 88 which forms the suitable characters which are written across the video image at the bottom (see FIG. 4). These data can be assigned to specific data locations on the image. Proceeding from left to right across the bottom of the image, it is preferable to record the date, time of day, the speed reading of the radar, and the reading of the car speedometer. Quite obviously, at the moment that the vehicle has stopped, the reading of the radar 90 and the speedometer 92 will change as a result of change in speeds. This data is recorded across the bottom. As the officer leaves the vehicle and lifts the clipboard 50 to carry with the officer, the portable aspect of the present disclosure comes into play. The FM mike and transmitter 46 sends the audio portion of the police investigation for audio recording. That data is input for recording on the cassette 24 by the VCR 22. That voice data is input through the video mixer. Because voice data is FM, it is demodulated and recorded in a fashion consistent with that of commercial television equipment now in use. As the officer steps out of the vehicle, the officer operates a switch which turns on the portable clipboard 50. When the switch is operated, it then begins to form data for transmission. The image converter 66 forms a suitable image of the field of view seen through the lens 64 of the system. That is provided to the transmitter 70 and then transmitted from the antenna 76 to the vehicle 10. Assume for the moment that nothing is transmitted from the vehicle to the clipboard 50. When the officer makes his investigation, a typical transaction involves asking for the drivers license of the person in question. The drivers license is read by the card reader 80 by passing it through the card reader. This assumes of course that licenses are encoded with the drivers license number and other pertinent data. If that data is not included, then the data is input through the clipboard to the CPU 78. The CPU 78 arranges all of the input data in a specified format. For instance, data can be input which represents the drivers license number, the registration of the vehicle including the car tag, the vehicle identification number (VIN) and other such numbers. Assume that all of these numbers are arranged by the CPU 78 either by inputting through the clipboard or the card reader 80. If need be, a hard copy can be printed at that time. If need be, a hard copy can be printed at that time. If need be, all of this data can be displayed on the LCD display 82. The data however is arranged in some predetermined format in the CPU and is then dumped to the transmitter. It transmits by the antenna 58 to the vehicle. For the moment, assume that no transmission is sent back from the vehicle to the clipboard 50.

Two types of transmission from the police officer were just noted. In one, the video image is provided and, in another aspect, the digital data is provided in a selected format. Both transmissions (meaning the video and digital data) are sent from the mobile transmitters in the clipboard to the vehicle and, from the vehicle, the data are transmitted to the remote antennas 42 and 44 (see FIG. 1 of the drawings). In the transfer, the vehicle serves as an intermediate link. To this end, the vehicle is required to provide both types of transmission, namely, high frequency video transmission and digital transmission. In one aspect of the present invention, both video and digital data are transmitted from the portable clipboard and are input to the VCR 20 and are recorded. They are recorded on the cassette 24.

The VCR is provided with two visual images. One image is obtained from the cameras 14 or 16 and the other image is obtained from the portable camera 66, referring to FIG. 3 of the drawings. It is possible to record both simultaneously. In one approach, the screens can be interleaved. That is, each scan can be interleaved so that alternate scans come from alternate images. Recording in this approach requires separation in the event that the cassette 24 has to be reviewed later. It is likewise possible to record with a split image as shown in FIG. 4. If a split image is used, the split is made so that the field of view at the time of playback is divided between the two images deployed left and right. Whatever the arrangement, both streams of video data are captured and recorded. Alternatively, the portable video data is recorded while the fixed camera 14 is switched off when the officer operates the portable camera. The audio portion is likewise recorded, and the digital data from the character generator 88 is recorded.

Assume at this time that the police officer wishes to have two way communications from some regionally located headquarters. In that instance, data can be transmitted after it is input at the clipboard or through the card reader 80. It is formatted at the CPU 78, transmitted by the transmitted through the antenna 58, linked to the car and transmitted from the car 10 to either of the remote antennas 42 and 44. A return transmission is then sent from the antenna 42 (as an example) to the police car. It is then coupled through the car mounted transmitter 34 and sent to the clipboard 50 and received at the antenna 58. This requires use of the receiver in the board 50. Digital data can be received by the receiver to the CPU 78 and then displayed either on the LCD display 82 or by forming a hard copy output by the printer. Alternately, video or characters can be received at the receiver 72, and is then displayed on the CRT 74.

Ordinarily, the data which is transmitted back to the policeman on foot and out of the vehicle involves a digital data output for the LCD 82. In that instance, the receiver 72 and the CRT 74 can be omitted if desired.

In the foregoing circumstances, it is assumed that no life threatening event occurs. Assume however that a life threatening event does occur. In large part, it will be captured on video. Better than that, the police office has the panic switch 56 which he can trigger. When the panic switch is operated, it forms a signal which is provided in the proper format through the CPU 78 to the transmitter and then through the antenna 58 to the vehicle. In terms of signal format, the panic signal can be suppression of the transmitted carrier signal from the transmitter to the antenna 58. Consider another format, namely, one where a coded SOS signal is transmitted. Without regard to the particular format, it is sent from the portable apparatus 50 through the police vehicle and to headquarters. The police vehicle is provided with the transponder 48 which automatically upon integration returns a reply to the antennas 42 and 44. This helps to locate the vehicle. The transponder 48 provides unique vehicle identification. Depending on the angle of propagation and the time of flight of the transmitted signals to the antennas 42 and 44, the police vehicle can be readily located within a particular area of the patrol area of the vehicle 10. Moreover, this enables the location to be determined quickly and that location can then be transmitted to the additional police vehicles in the area. They can be directed immediately to the location of the vehicle 10 to provide added assistance. In the event that such life threatening events occur in the area of the vehicle 10, the camera 14 continues to operate and provide video input. Likewise, the portable camera 66 continues to provide its own video. All of this data is input so that both data from the car supported devices and the portable clipboard 50 are continuously recorded. This is particular helpful in providing emergency relief and remedial training.

The vehicle 50 can carry two such clipboards 50. In that event, they can be provided to two different police officers. On dismounting from the vehicle 10, they can go in different directions in making an investigation. In that event, the data from both is recorded on the cassette 24, again taking into account the recording of multiple sources of video data. Even if there is some modest lost in definition, that loss is overcome by virtue of the relatively immediate recordation of important data in the field. That data, not only recorded, but available for dynamic transmission, aids and assists in providing enhanced protection for police officers on foot. This transmission system is particularly effective in providing perceived security for the police officers.

The construction of the clipboard 50 should be considered. It is provided with the components shown in FIG. 2 which are integrated into the housing of the clipboard. It functions as a backing where the police officer can write tickets. Other input devices can be used with the clipboard. As an example, handwritten input encoders are readily known. In another aspect, handwritten instructions which are obtained by marking with a pointer or pencil on the CRT screen for touch operation can be used. One example is the Newton pad of Apple Computers. Many other features can be used in the clipboard. As shown in the preferred embodiment of FIG. 2, the size, bulk and thickness of the clipboard can be streamlined by omitting the video receiver 72 and the CRT 74. Likewise, either the printer or the LCD display can be omitted without any loss. The input devices can be reduced by omitting the card reader 80 from the clipboard.

It is possible to make an arrest, issue a traffic ticket, set a court appearance and provide specific instructions for remedial driver activities in the field. Assume for purposes of discussion that the accused drive of a vehicle requires vehicle service. Appointments can be made with vehicle inspection stations such as those that inspect for excessive exhaust gases. Appointments with traffic court can be made and confirmed on the spot. A check of criminal records can be carried out so that the person can be checked for arrest warrants that might relate to more serious charges. Any number of additional data can be obtained.

The clipboard can be constructed so that, by all appearance, it is merely a thick clipboard. It need not be provided with conspicuous features which are readily seen by personnel in the vehicle. For instance, the clipboard can be provided with an edge mounted clasp so that the drivers license can be momentarily attached to it, and a blank ticket from can be mounted under the clip 54. By all appearance, the clipboard then appears to be a typical clipboard.

Ease of the use of the equipment is notable. When the police officer begins the job shift, the FM mike and transmitter 46 are attached on the shirt, collar, or other appropriate location for easy use. The clipboard is preferably constructed with a suitable plug and socket which enables the clipboard to be stabbed into a mating plug or socket thereby enabling charging of the power supply 68. This provides a rest or holder for the clipboard. Charging occurs over the interval that the clipboard is not in use. Immediately when the clipboard is pulled from the charging mechanism, it can be switched on so that all the circuits are ready by provision of the voltages necessary for operation. The officer can then grasp and hold the clipboard in one hand by maintaining his hand on the panic switch 56.

Protecting of the public is enhanced through the use of this system. This enhancement in part derives from the certainty that only video records can provide. For instance, where a person is accused of driving under the influence of alcohol or forbidden narcotics, field tests indicative of sobriety can be administered on the spot. If the driver simply cannot walk or perform the field test, that is recorded. That leads more readily to conviction where the driver was intoxicated, and more readily leads to acquittal where there is no intoxication. In other benefit, the security of the police officer can be reviewed by experienced senior officers. Review of the tape may well show how the officer should act so that the officer can conduct his business safely, wisely and carefully. Dynamic instruction in that circumstance may well protect the life of the officer.

While the foregoing is directed to the preferred embodiment, the scope is determined by the claims which follow.

What is claimed is:

1. A method of conducting a police investigation by a police officer in a police car wherein the officer leaves the car to conduct the investigation and the method comprises the steps of:
   (a) leaving the police car to conduct an investigation;
   (b) collecting data presented in digital form and inputting the data to a carried digital data input device;
   (c) transmitting the digital data from the police officer to the car;
   (d) receiving at the police car the transmitted digital data and retransmitting to a police station the received digital data to a remote location so that the digital data prompts a response from the police station to provide response data for the police officer;
   (e) transmitting the response data from the police station wherein the transmitted data is responsive to the received digital data and the response data assists the police officer investigation; and
   (f) receiving the response data which is converted into a suitable image by an output device carried by the police officer.

2. The method of claim 1 wherein the police officer transmits digital data comprising personnel or vehicle identification.

3. The method of claim 2 wherein the digital data is transmitted to enable police officers at the police station to check the criminal records and provide a response data on the criminal records.

4. The method of claim 1 including the step of transmitting digital data and a video image therewith from the police officer.

5. The method of claim 1 including the step of obtaining digital data from a magnetic strip reader reading a card.

6. The method of claim 1 including the step of obtaining digital data by inputting the digital data at a keyboard.

7. The method of claim 1 including the step of presenting response data at the output device carried by the police officer by forming data on an LCD display.

8. The method of claim 1 including the step of presenting response data at the output device carried by the police officer by forming on a printer.

9. The method of claim 1 including the step of presenting response data at the output device carried by the police officer by forming an image on a video screen.

10. The method of claim 1 including the step of receiving instructions regarding court appearance for the police officer.

11. The method of claim 1 including the step of receiving information specific to a car based on car identification data provided by the police officer.

12. The method of claim 1 including the step of sending and receiving digital data by the officer out of the police car and including the step of recording the sent and received data on a cassette in the police car.

13. The method of claim 1 including the step of sending and receiving digital data from the police officer out of the police car, and further forming a fixed field of view video image from a video camera fixed in location on the police car.

14. The method of claim 1 including the step of operating a deadman switch by the police officer upon emerging from the car which operation is continued to provide a continuous data input indicative of police officer safety and security.

15. The method of claim 1 including the step of forming both digital data and also video image signals by the police officer out of the police car and recording both digital and video signals in the police car.

16. The method of claim 1 including the step of making a traffic stop involving a speeding vehicle, and recording the radar measured speed of the stopped vehicle, and also recording the time and data wherein the records are recorded on a cassette hidden from view in the police car.

17. The method of claim 1 including the step of checking criminal records at the police station and providing an indication therefrom to the police officer.

18. The method of claim 1 including the step of operating a concealed camera to obtain a video image for recording on a cassette while the police officer is out of the police car.

19. The method of claim 18 including the step of operating a movable video image camera and a fixed video image camera simultaneously while the police officer is out of the police car.

20. A method of conducting a field investigation by a police officer in a police car wherein the method comprises the steps of:
   (a) moving from the police car while carrying a portable data generator to form a dynamic data stream subject to control by the police officer;

(b) transmitting the dynamic data stream from the police car;

(c) adding to the transmitted dynamic data stream location data of the police car;

(d) receiving the transmitted dynamic data stream and location data of the police car elsewhere to monitor the field investigation;

(e) positioning a camera to observe the driver of another car, and including the steps of recording video images of the another car;

(f) retransmitting the video image for the camera received at the police car to a remote receiver location so that the transmitted image is available with the location data; and (g) transmitting a video image from the camera, and also transmitting therewith digital data indicative of personnel identification.

21. The method of claim 20 wherein the digital data is transmitted mixed with the video transmission and is transmitted during blanking of the video image.

22. A method of conducting a field investigation by a police officer in a police car wherein the method comprises the steps of:

(a) moving from the police car while carrying a portable data generator to form a dynamic data stream subject to control by the police officer;

(b) transmitting the dynamic data stream from the police car;

(c) adding to the transmitted dynamic data stream location data of the police car;

(d) receiving the transmitted dynamic data stream and data of the police car elsewhere to monitor the field investigation;

(e) positioning a camera to observe the driver of another car, and including the steps of recording video images of the other car; and (f) transmitting a video image, and also transmitting digital data indicative of the driver's license number and other identification data obtained by the police officer while using the camera.

23. A method of conducting a police investigation by a police officer in a police car wherein the officer in the car conducts the investigation and the method comprises the steps of:

(a) operating the police car to conduct an investigation;

(b) collecting digital data output from a digital data device;

(c) transmitting the digital data from the police car with police car location data;

(d) receiving elsewhere the transmitted digital data at a remote location so that the digital data enables response data to be sent to the police officer;

(e) transmitting the response data responsive to the received digital data wherein the response data assists the police officer investigation; and (f) receiving the response data which is converted into a suitable output by an output device for the police officer.

24. The method of claim 23 wherein the police officer transmits digital data comprising personnel or vehicle identification.

25. The method of claim 24 wherein the digital data is transmitted to enable police officers at a remote location to check the criminal records and provide a response data the comprising criminal records.

26. The method of claim 23 including the step of transmitting digital data and a video image therewith from the police officer.

27. The method of claim 23 including the step of obtaining digital data from a magnetic strip reader reading a card.

28. The method of claim 23 including the step of obtaining digital data by inputting the digital data at a keyboard.

29. The method of claim 23 including the step of presenting response data at the output device carried by the police officer by forming data on an LCD display.

30. The method of claim 23 including the step of presenting response data at the output device carried by the police officer by forming data by a printer.

31. The method of claim 23 including the step of presenting response data at an output device carried by the police officer by forming an image.

32. The method of claim 23 including the step of receiving instructions regarding court appearance for the police officer.

33. The method of claim 23 including the step of receiving information specific to a car based on car identification data provided by the police officer.

34. The method of claim 23 including the step of sending and receiving digital data by the officer out of the police car and including the step of recording the sent and received data in the police car.

35. The method of claim 23 including the step of sending and receiving digital data from the police officer out of the police car, and further forming a fixed field of view video image from a video camera fixed in location on the police car.

36. The method of claim 23 including the step of operating a deadman switch by the police officer upon emerging from the police car which operation is continued to provide a continuous data input indicative of police officer safety and security.

37. The method of claim 23 including the step of forming both digital data and also video image signals by the police officer out of the police car and recording both digital and video signals in the police car.

38. The method of claim 23 including the step of making a traffic stop involving a speeding vehicle, and recording the radar measured speed of the stopped vehicle, and also recording the time and data wherein the records are hidden from view in the police car.

39. The method of claim 23 including the step of remotely checking criminal records and providing an indication therefrom to the police officer.

40. The method of claim 23 including the step of operating a concealed camera to obtain are recorded video image while the police officer is out of the police car.

41. The method of claim 40 including the step of operating a movable video image camera and a fixed video image camera simultaneously while the police officer is out of the police car.

42. A video apparatus used by a police officer in a police car wherein the video apparatus is used by the police officer while investigating from the car, the apparatus comprising:

(a) a housing enclosing a video camera in said housing;

(b) a transmitter connected to the video camera for transmitting a video signal from said camera for reception;

(c) a video recorder in the police car for recording the received video transmission on a medium hidden within in the police car;

(d) a location indicator connected to said recorder to enable location data to be recorded with the recorded video signal;

(e) a time and date generator forming a time and data signal to be recorded with the video signal; and (f) a digital data input device on said housing; wherein (g) said housing is portable to be carried by the officer and includes a magnetic strip scanner.

43. A method of conducting a police investigation by a police officer in a police car wherein the method comprises the step of:

(a) storing a portable surveillance device comprising a portable video camera and a digital data input device in the police car;

(b) moving from the police car while carrying the portable surveillance device to form a video image having a field of view controlled by movements of an officer from the police car;

(c) inputting digital data pertinent to the police investigation into the digital data input device;

(d) transmitting the video image to the police car;

(e) transmitting the digital data to the police car;

(f) receiving response data pertinent to the input digital data using the portable surveillance device; and (g) recording the transmitted video image and the digital data on a storage medium secured within the police car.

44. The method of claim 43 including the step of initially positioning said portable video camera capable of forming an image enclosed within said portable surveillance device to secrete the camera so that the camera is not readily seen.

45. The method of claim 43 including the preliminary step of charging batteries for the portable surveillance from the power system of the police car.

46. The method of claim 43 wherein the police officer carries an audio responsive circuit for voice data and said audio responsive circuit comprises said digital data input device.

47. The method of claim 43 including the steps of recording a video image from the portable camera and also recording video images from a fixed field of view camera mounted on the car wherein the two separate images provide information regarding the activities occurring adjacent to the police car.

48. The method of claim 43 including the step of recording the video image and an indicia of the time of day on said medium.

49. The method of claim 48 further including the step of recording car speeds.

50. The method of claim 43 wherein the portable surveillance device is carried by hand by an officer on foot in the immediate vicinity of the police car and scans an adjacent accident or crime scene during investigation by the officer.

51. The method of claim 43 wherein the portable surveillance device is positioned to observe the driver of another car, and recording video images of the driver of the another car including images obtained indicative of driver sobriety.

52. The method of claim 43 including the further step of retransmitting using assigned video bandwidths the video image from the portable camera received at the police car to a remote receiver location so that the transmitted image is available to additional personnel for analysis and response.

53. The method of claim 43 including the step of transmitting a video image from the portable camera, and also transmitting therewith digital data indicative of personnel identification which is input into the digital data input device within the portable surveillance device.

54. The method of claim 53 wherein the digital data is transmitted mixed with the video transmission and is transmitted during blanking of the video image.

55. The method of claim 43 wherein the portable surveillance device is provided with a normally closed deadman switch, and said switch is operated continuously during use to provide an indication of police officer safety and security.

56. The method of claim 43 including the step of transmitting a video image, and also transmitting digital data indicative of the drivers license number and other identification data obtained by the police officer and input into the digital data input device within the portable surveillance device.

57. The method of claim 43 wherein the portable surveillance device is moved in area in front of the police car subject to illumination by police car headlights to obtain a movable field of view illuminated by the headlights.

58. A portable apparatus used by a police officer in a police car wherein the portable apparatus is carried by the police officer on emerging from the car, the apparatus comprising:

(a) a hand held housing enclosing a power supply wherein the power supply is selectively connected to and disconnected from the power system of the police car;

(b) a video camera within said housing forming a video image;

(c) a digital data input device within said housing;

(d) a transmitter connected to the video camera and the digital data input device for transmitting a video signal and digital data from said housing to the police car for reception; and (e) a recorder remotely recording the received video and digital data transmission, wherein the recorder is secured in the police car.

59. The apparatus of claim 58 including a writing surface on said housing carried by the police officer.

60. The apparatus of claim 58 wherein said housing encloses a video signal receiver and video screen for signals received at the receiver.

61. The apparatus of claim 58 wherein said housing includes a keyboard input device.

62. The apparatus of claim 58 wherein said housing includes a card reader device.

63. The apparatus of claim 58 wherein said housing includes a magnetic strip scanner.

64. The apparatus of claim 58 including digital said data input device on said housing into which the officer enters data.

65. The apparatus of claim 58 wherein said hosing includes a LCD output device from which the officer reads response information.

66. The apparatus of claim 58 wherein said housing includes a printer device from which the officer receives response information while outside of the police car.

67. The apparatus of claim 58 wherein said housing includes a clipboard on the top thereof to clip documents clipped on the top of said housing.

68. The apparatus of claim 58 wherein said housing includes a writing surface thereon.

* * * * *

UNITED STATES PATENT AND TRADEMARK OFFICE
CERTIFICATE OF CORRECTION

PATENT NO. : 6,262,764 B1
DATED : July 17, 2001
INVENTOR(S) : Roger Peterson

Page 1 of 1

It is certified that error appears in the above-identified patent and that said Letters Patent is hereby corrected as shown below:

<u>Title page,</u>
In the inventor name, please replace "Perterson" with -- Peterson --.

Signed and Sealed this

First Day of January, 2002

Attest:

JAMES E. ROGAN
Attesting Officer
Director of the United States Patent and Trademark Office